(12) United States Patent
Lin

(10) Patent No.: US 11,096,768 B1
(45) Date of Patent: Aug. 24, 2021

(54) BRUSH HEAD OF AN ELECTRIC TOOTHBRUSH

(71) Applicant: Gaosheng Lin, Maoming (CN)

(72) Inventor: Yuhai Lin, Maoming (CN)

(73) Assignee: Gaosheng Lin, Maoming (CN)

( * ) Notice: Subject to any disclaimer, the term of this patent is extended or adjusted under 35 U.S.C. 154(b) by 0 days.

(21) Appl. No.: 17/244,907

(22) Filed: Apr. 29, 2021

(30) Foreign Application Priority Data

Apr. 16, 2021 (CN) .......................... 202110408376.6

(51) Int. Cl.
*A61C 17/22* (2006.01)
(52) U.S. Cl.
CPC .................................. *A61C 17/222* (2013.01)
(58) Field of Classification Search
CPC ....... A61C 17/222; A46B 5/0095; A46B 7/04; A46B 7/042
See application file for complete search history.

(56) References Cited

U.S. PATENT DOCUMENTS

| | | |
|---|---|---|
| 8,782,841 B2 | 7/2014 | Sale et al. |
| 2005/0108838 A1 | 5/2005 | Schaefer |
| 2018/0049854 A1 | 2/2018 | Hall |
| 2021/0100346 A1* | 4/2021 | Dishon ................ A46B 5/0095 |

FOREIGN PATENT DOCUMENTS

| | | | |
|---|---|---|---|
| CA | 2004029 A1 * | 5/1990 | ............. A46B 5/007 |
| CN | 101902986 A | 12/2010 | |
| CN | 203315105 U | 12/2013 | |
| CN | 206183417 U | 5/2017 | |
| CN | 108087438 A | 5/2018 | |
| CN | 209107644 U | 7/2019 | |
| CN | 209899641 U | 1/2020 | |

* cited by examiner

*Primary Examiner* — Shay Karls
(74) *Attorney, Agent, or Firm* — Andrew C. Cheng

(57) ABSTRACT

A brush head includes a connecting member detachably mounted in a brush head body, and an elastic element mounted on an outer surface of the connecting member and including a connecting portion with a slot and two clamping portions. A through opening is formed in the connecting member and the middle of each clamping portion is bent inwardly to form an abutting arch capable of deforming elastically in a radial direction of the slot. When the abutting arches are not stressed, the distance between vertex ends of the abutting arches is smaller than a radial thickness of the driving shaft of the electric toothbrush. After the driving shaft is inserted into the slot, the two abutting arches penetrating through the through openings is deformed and directly abut against the driving shaft so that the brush head and the driving shaft are connected stably. The brush head is simple in structure.

11 Claims, 8 Drawing Sheets

BRUSH HEAD OF AN ELECTRIC TOOTHBRUSH

TECHNICAL FIELD

The present disclosure relates to the technical field of toothbrushes, in particular to a brush head of an electric toothbrush.

BACKGROUND

With the improvement of living standard, people are paying more and more attention to oral health, and electric toothbrushes are becoming ever popular because of their advantages of being high in cleaning capacity, easy to use and capable of reducing damage to teeth/gums.

A typical electric toothbrush comprise a handle and a replaceable brush head, wherein the handle has a driving shaft protruding out of one end of the handle and is internally provided with a driving device for driving the driving shaft to rotate/vibrate, the driving shaft is inserted into the brush head, and the torque of the driving shaft is transmitted to the brush head by a connecting structure between the driving shaft and the brush head.

It can thus be seen that the connecting structure between the brush head and the driving shaft is of great importance for the connection stability between the brush head and the driving shaft. At present, the connecting structures between the brush head and the handle of the electric toothbrush are of different forms, and some of these structures are complicated and have too many assembled parts, thus resulting in high production costs.

BRIEF SUMMARY OF THE INVENTION

It is desired to provide an improved brush head for an electric toothbrush which is simple in structure and capable of maintaining a stable connection between the brush head and a driving shaft of the electric toothbrush.

A brush head of an electric toothbrush comprises a hollow brush head body; bristles disposed at an end of the brush head body; and a connecting member and an elastic element being disposed in the brush head body. The connecting member is detachably mounted in the brush head body, the connecting member defining a slot to allow a driving shaft of an electric toothbrush to be mounted therein. The elastic element is mounted on an outer surface of the connecting member and comprises a connecting portion and two clamping portions extending from opposite sides of the connecting portion, the connecting portion is located at a top of the connecting member, and ends, close to the connecting portion, of the clamping portions and ends, away from the connecting portion, of the clamping portions are clamped between the connecting member and the brush head body, so that a resilience force is generated in a middle of each said clamping portion. A through opening is formed in a position, corresponding to a middle portion of each of the clamping portions, of the connecting member, and the middle portion of each of the clamping portions is inwardly bent into the through opening to form an abutting arch capable of deforming elastically in a radial direction of the slot. When the abutting arches are not stressed, a distance between vertex ends of the abutting arches is smaller than a radial thickness of the driving shaft of the electric toothbrush, and when the driving shaft is inserted into the slot of the connecting member, the abutting arches extend through the through openings with the vertex ends directly abutting against two opposite sides of the driving shaft respectively.

Compared with the prior art, the embodiments of the invention has the following beneficial effects: the distance between the vertex ends of the two abutting arches is smaller than the radial thickness of the driving shaft when the abutting arches are not stressed. After a handle and the brush head of the electric toothbrush are assembled, the driving shaft will apply an outward expansion force to the clamping portions to cause the abutting arches to deform and the inner wall of the brush head body forces the abutting arches to rebound, so that the two clamping portions tightly clamp the driving shaft from both sides of the driving shaft. The brush head has a simple structure, and the driving shaft is clamped by the elastic element so that a stable connection is formed between the brush head and the driving shaft.

BRIEF DESCRIPTION OF THE SEVERAL VIEWS OF THE DRAWINGS

To more clearly explain the technical solutions of the embodiments of the invention or the prior art, the drawings used for describing the embodiments of the invention or the prior art will be briefly introduced below. Obviously, the drawings in the following description merely illustrate some embodiments of the invention, and those ordinarily skilled in the art can obtained other drawings according to the following ones.

DETAILED DESCRIPTION OF THE INVENTION

To allow those skilled in the art to have a better understanding of the technical solution of the embodiments of the invention, the technical solution of the embodiments of the invention will be clearly and completely described below in conjunction with the accompanying drawings of the embodiments. Obviously, the embodiments in the following description are merely illustrative ones, and not all possible ones of the invention. All other embodiments obtained by those ordinarily skilled in the art based on the following ones should also fall within the protection scope of the embodiments of the invention.

Figure 1:
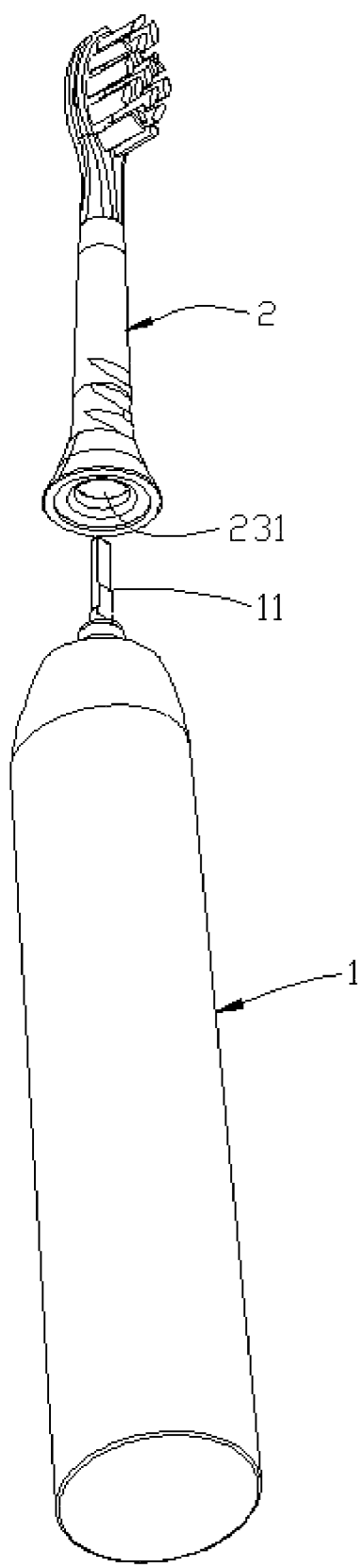
FIG. 1 is an exploded view of a brush head and a handle of an electric toothbrush in a preferred embodiment of the invention.
Figure 2:
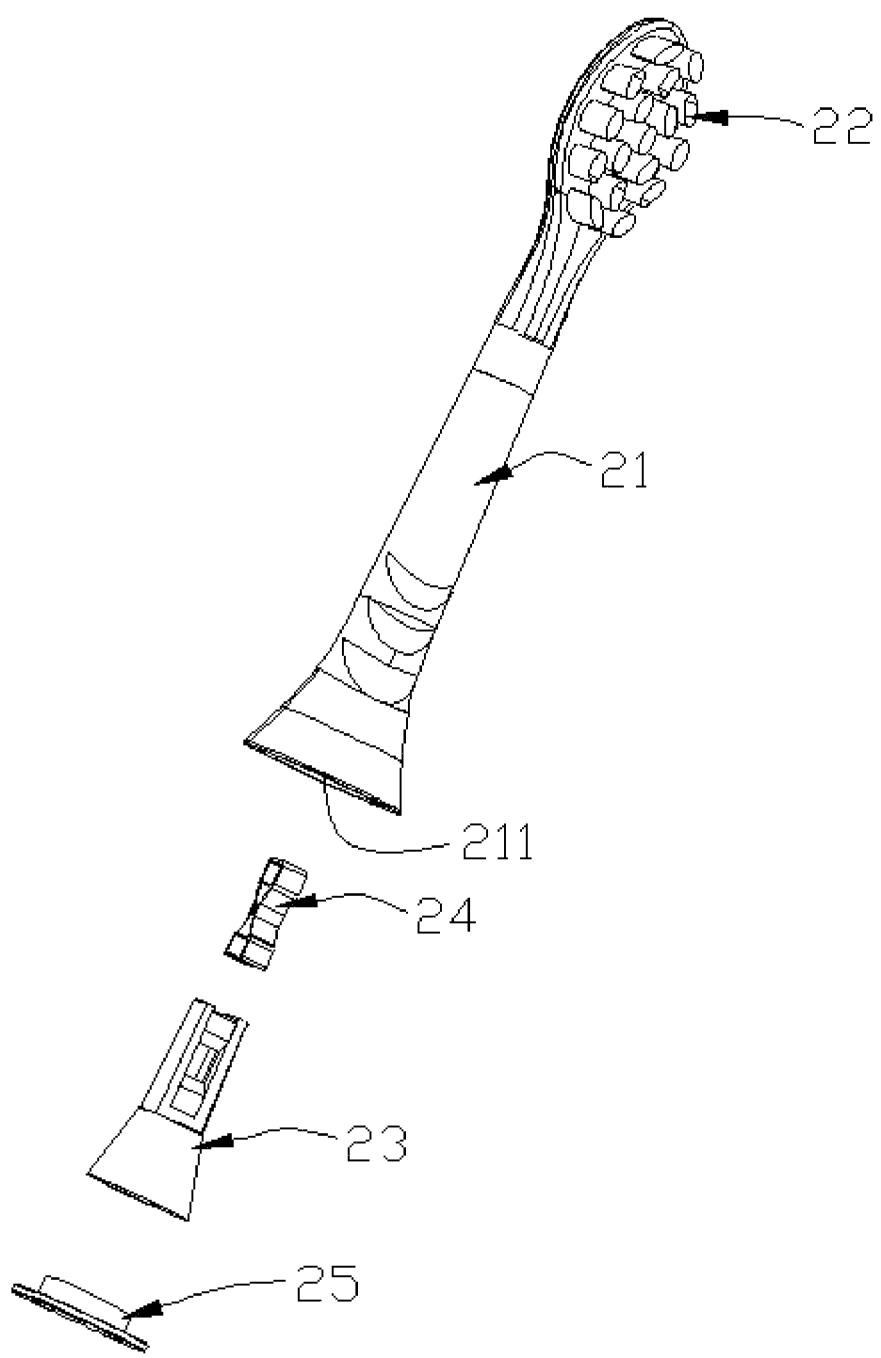
FIG. 2 is an exploded view of the brush head in FIG. 1.
Figure 3:
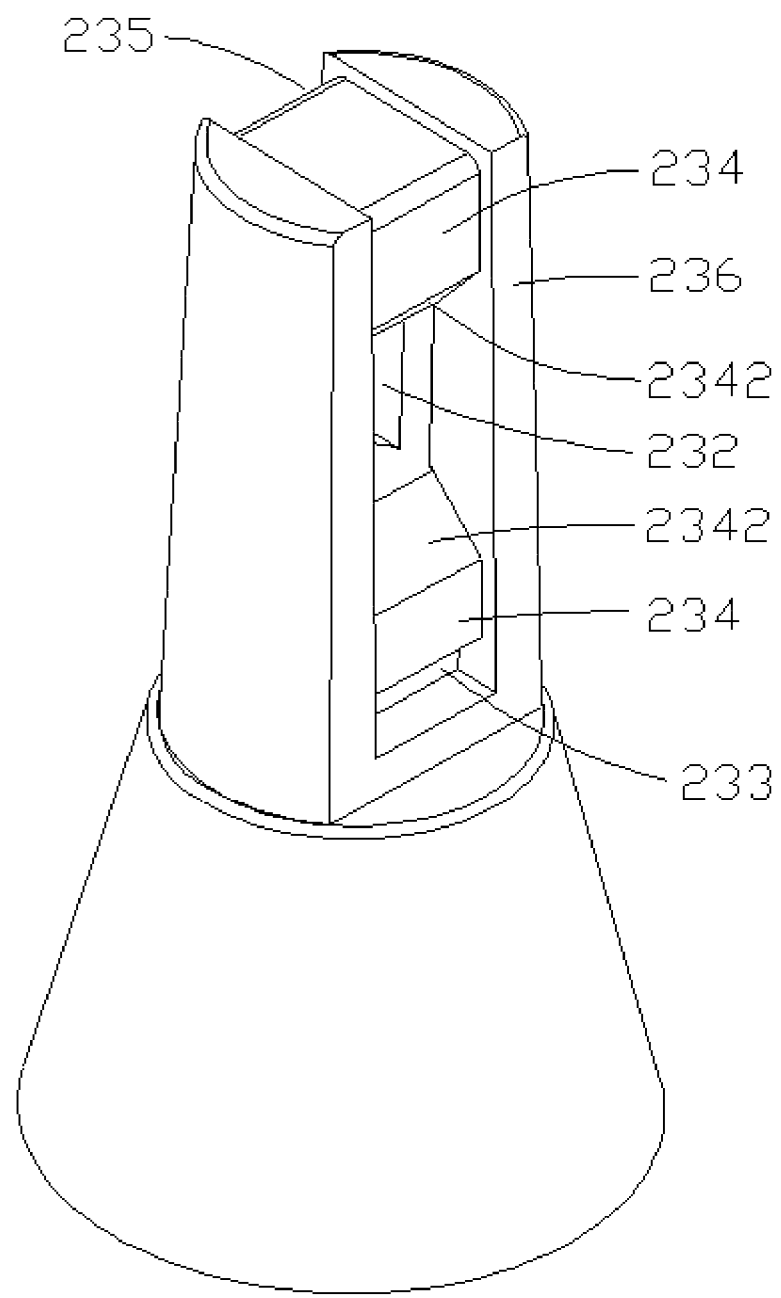
FIG. 3 is a perspective view of a connecting member in FIG. 2.

Referring to FIG. 1 and FIG. 2 which illustrate a preferred embodiment of the invention, an electric toothbrush comprises a handle 1 and a replaceable brush head 2, wherein a driving shaft 11 protrudes out of one end of the handle 1 and is being insertable into the brush head 2.

The brush head 2 of the electric toothbrush comprises a hollow brush head body 21, bristles 22, a connecting member 23, an elastic element 24 and a decorative ring 25. The bristles 22 are located at one end of the brush head body 21, the connecting member 23 is detachably mounted in the brush head body 21, the elastic element 24 is mounted on the outer surface of the connecting member 23, and the decorative ring 25 is located at an end, close to the handle 1, of the brush head body 21 and is different in color from the handle 1 and the brush head body 21 to identify the brush head 2.

Referring also FIG. 3 to FIG. 8, a mounting hole 211 matching the connecting member 23 in shape is formed in an end, away from the bristles 22, of the brush head body 21, and the connecting member 23 is mounted in the mounting hole 211. A slot 231 allowing the driving shaft 11 to be mounted therein is formed in the connecting member 23. The elastic element 24 is formed by an integrally bent metal sheet and comprises a connecting portion 241 and two clamping portions 242 which are bent from two opposite sides of the connecting portion 241 respectively. The connecting portion 241 is located at the top of the connecting member 23. Ends 2421, close to the connecting portion 241, of the clamping portions 242 and ends 2422, away from the connecting portion 241, of the clamping portions 242 are clamped between the connecting member 23 and the brush head body 21, so that a resilience force is generated in the middle of each clamping portion 242. A through opening 232 is formed in a position, corresponding to the middle of each clamping portion 242, of the connecting member 23. The middle of the clamping portions 242 are bent toward each other to form abutting arches 2423 capable of deforming elastically in the radial direction of the slot 231. When the driving shaft 11 is inserted into the slot 231 of the connecting member 23, the two abutting arches 2423 penetrating through the through openings 232 directly abut against two opposite sides of the driving shaft 11. When the abutting arches 2423 are not stressed, the distance between vertexes of the two abutting arches 2423 is smaller than the radial thickness of the driving shaft 11 between the two opposite sides.

When the brush head 2 and the handle 1 are assembled together, the driving shaft 11 is inserted into the slot 231 and applies an outward expansion force to the two abutting arches 2423 to cause the abutting arches 2423 to deform. Because the two ends 2421 and 2422 of the clamping portions 242 are clamped between the connecting member 23 and the brush head body 21, the abutting arches 2423 are forced to rebound to enable the two clamping portions 242 to tightly clamp the driving shaft 11 from both sides. When the electric toothbrush is used, the driving shaft 11 is clamped by the elastic element 24 to be firmly assembled with the connecting member 23 so that the driving shaft 11 drives the bristles 22 to rotate/vibrate to complete cleaning.

Specifically, matching portions of the connecting member 23 and the elastic element 24 are approximately conical, and the two clamping portions 242 incline outwards relative to the middle line located between the two clamping portions 242. In some embodiments, each clamping portion 242 inclines outwards relative to the middle line by 4°. Each of the two clamping portions 242 has a free end formed at a side away from the connecting portion 241. The free ends are bent and extended toward with each other to form limiting hooks 2424, recesses 233 are correspondingly formed in the connecting member 23, and the limiting hooks 2424 are slidably disposed in the recesses 233. Due to the clamping portions 242 are limited in the space between the inner wall of the brush head body 21 and the connecting member 23 in the radial direction of the driving shaft 11, when the abutting arches 2423 deform elastically, the limiting hooks 2424 will slide vertically in the recesses 233 in the axial direction of the slot 231.

An end, close to the bristles 22, of the connecting member 23 is provided with two limiting blocks 234 which are arranged in a spaced manner in the axial direction of the slot 231, and the through openings 232 are located between the limiting blocks 234. The connecting portion 241 is clamped between the top end, of the limiting block 234 close to the bristles 22 and the inner wall of the brush head body 21, the two clamping portions 242 are located at two opposite sides of the limiting blocks 234, respectively, and the abutting arches 2423 correspond to the through openings 232 in position and are bent into the through openings 232. Each limiting block 234 has two limiting portions 2341 which are symmetrically arranged left and right along the axial direction of the slot 231, the slot 231 extends from one end of the connecting member 23 into the limiting block 234 close to the bristles 22, and the two clamping portions 242 abut against the two symmetrical limiting portions 2341, so that the two sides of the driving shaft 11 are stressed uniformly.

When the brush head 2 and the handle 1 are assembled together, the driving shaft 11 is inserted into the slot 231 from the bottom of one end of the connecting member 23, penetrates through one limiting block 234 and is then inserted into the limiting block 234 close to the bristles 22. The two limiting blocks 234 are arranged one above the other in the axial direction of the slot 231, so that the stability of the driving shaft 11 can be further enhanced, and abnormal swinging of the driving shaft 11 in the radial direction is avoided. A gap between the driving shaft 11 and the inner wall of the slot 231 of the limiting block 234 is preferably 0.02 mm. If the gap is too large, the driving shaft 11 will swing in the slot 231.

In addition, the mounting position of the outer surface of the connecting member 23 corresponding to the elastic element 24 is formed with a concave mounting groove 235, wherein the depth of the mounting groove 235 corresponding to the clamping portions 242 is smaller than the thickness of the clamping portions 242, so that after the connecting member 23 is assembled on the brush head body 21, the inner wall of the brush head body 21 can clamp/grasp the two clamping portions 242 of the elastic element 24 to thereby provide a rebound force for the two abutting arches 2423. In this embodiment, surfaces 2425 of the clamping portions 242 protrude out of the surface of the connecting member 23 by a thickness of 0.01 mm-0.3 mm. In addition, a gap between the surface, corresponding to the two clamping portions 242, of the connecting member 23 and the inner wall of the brush head body 21 is 1 mm-1.8 mm; if the gap is too small, the driving shaft 11 cannot be inserted into the slot 231; and if the gap is too large, the rebound force provided by the inner wall of the brush head body 21 will be insufficient, which in turn leads to unstable clamping. In this embodiment, the gap between the surface, corresponding to the two clamping portions 242, of the connecting member 23 and the inner wall of the brush head body 11 is 1.3 mm.

One of the two opposite outer walls of the connecting member 23 is a plane 236, and the other one is an arc surface. Such an asymmetric design can prevent mistaken alignment when the connecting member 23 and the brush head body 11 are assembled.

To ensure that the elastic element 24 and the connecting member 23 are assembled in place, portions, close to the two ends of the two abutting arches 2423, of the limiting portions 2341 are slopes 2342, and the two ends of the two abutting arches 2423 abut against the corresponding slopes 2342, so that the abutting arches 2423 are sustained by the slopes 2342 and the two ends of the abutting arches 2423 are prevented from being suspended.

Figure 4:
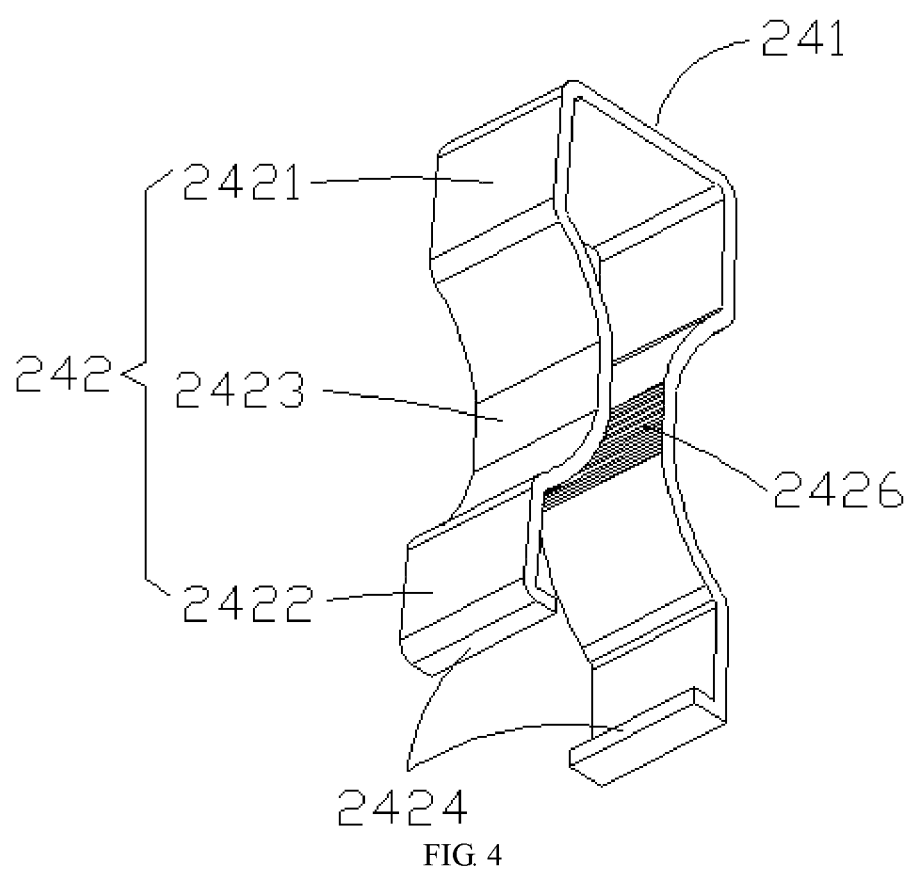
FIG. 4 is a perspective view of an elastic element in FIG. 2.
Figure 5:
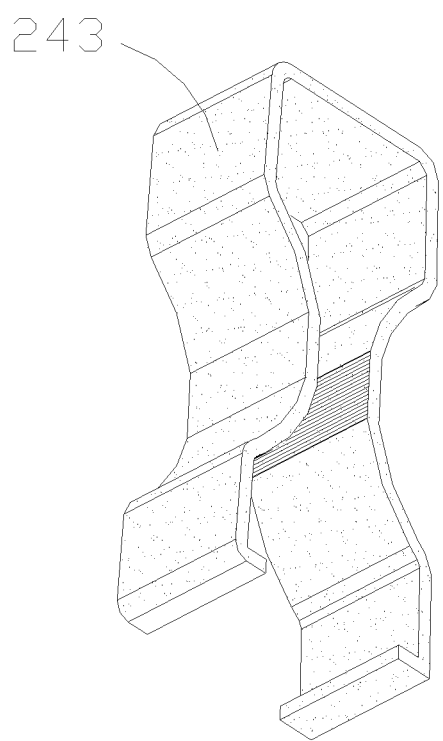
FIG. 5 illustrates an alternative elastic element which is similar to the elastic element shown in FIG. 4 except that the alternative elastic element has a coating.
Figure 6:
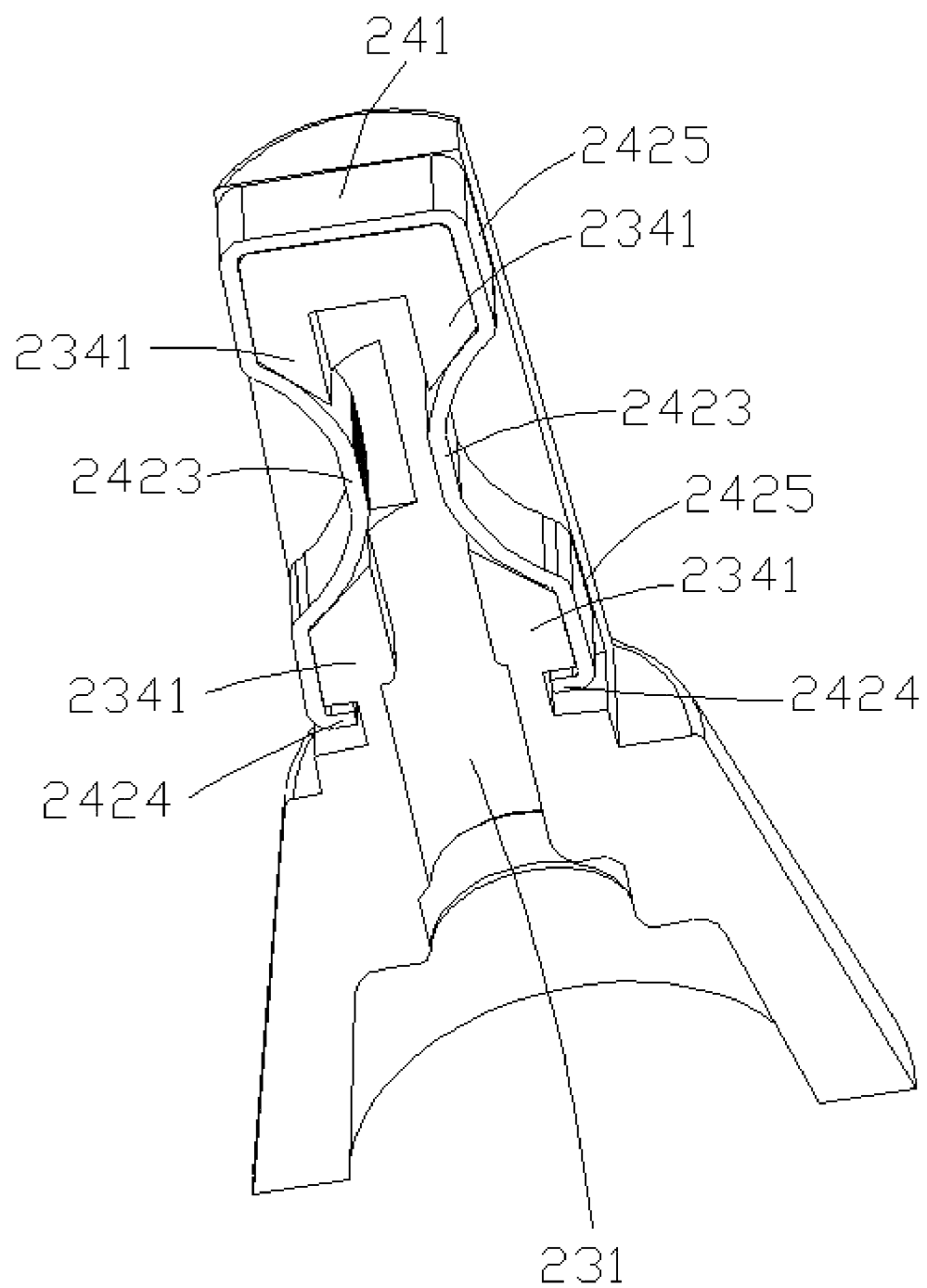
FIG. 6 is an axial sectional view of the connecting member and the elastic element in FIG. 2 after assembly.
Figure 7:
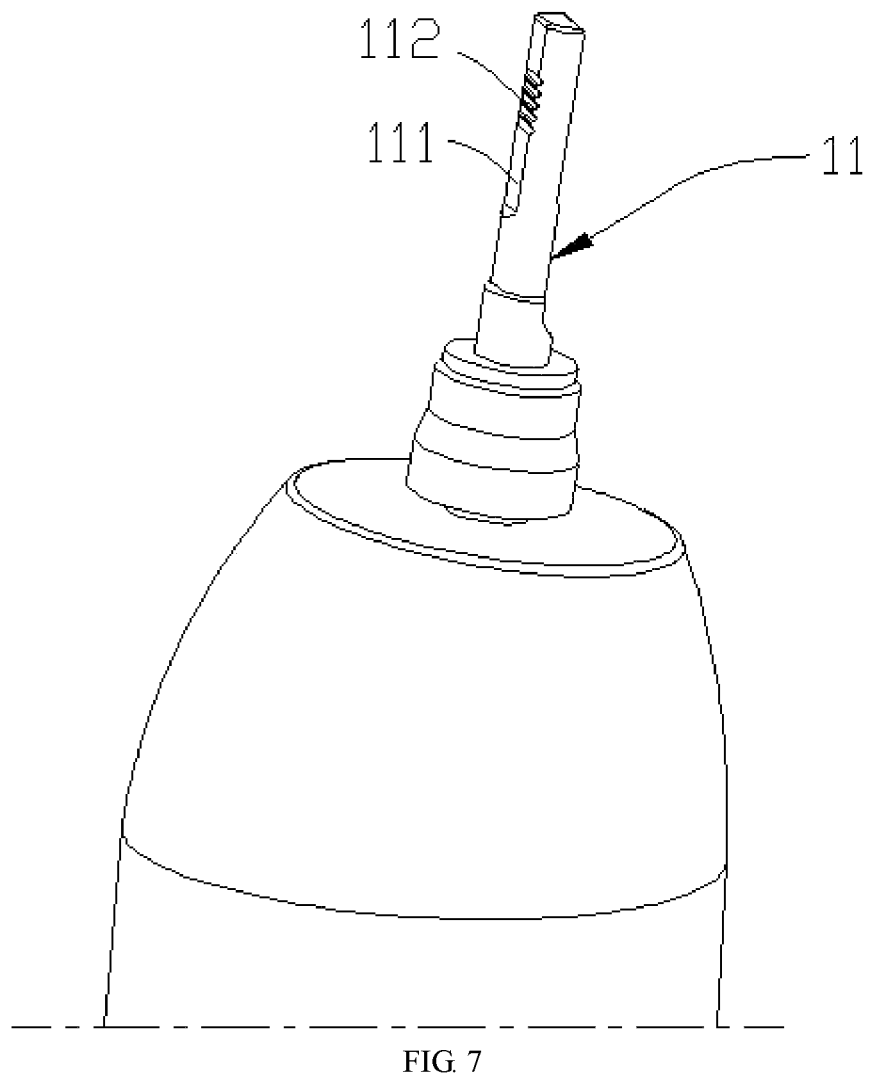
FIG. 7 is a perspective view of a driving shaft in FIG. 1.
Figure 8:
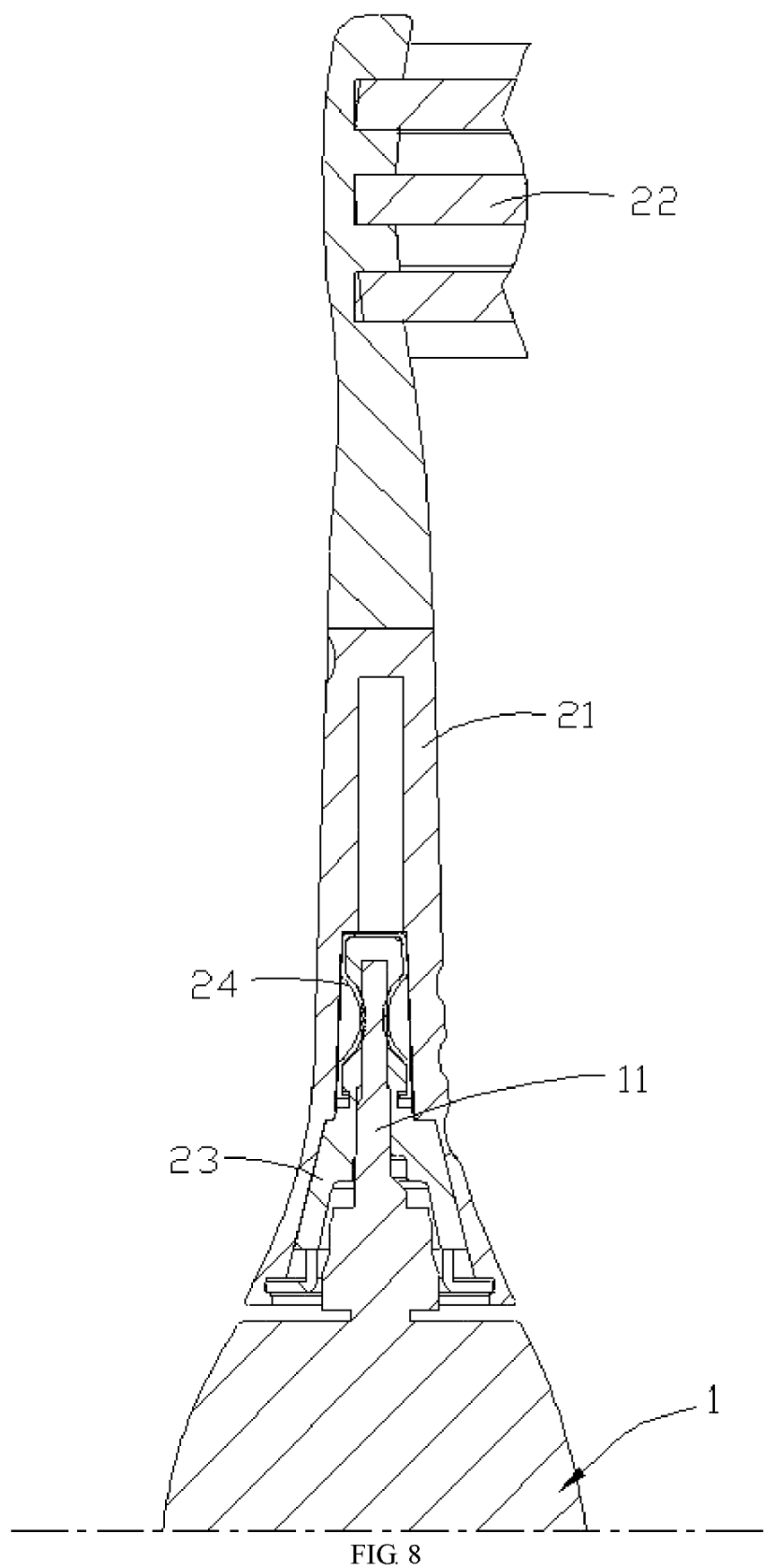
FIG. 8 is an axial sectional view of the brush head and the driving shaft matched with the brush head after assembly in the embodiment shown in FIG. 1.

As shown in FIG. 4, a distance between the vertex end of one of the clamping portions 242 and a central axis of the slot 231 is equal to a distance between the vertex end of the other of the clamping portions and the central axis of the slot, and the two clamping portions 242 are symmetrical or asymmetrical in shape with respect to the central axis of the slot 231. In this embodiment, the two clamping portions 242 are asymmetric in shape with respect to the central axis of the slot 231, the vertex end of the abutting arch 2423 of one abutting portion 242 is a plane to enlarge the contact area between the clamping portion 242 and the driving shaft 11, and the vertex end of the abutting arch 2423 of the other clamping portion 242 is an arc surface. The plane of the top end of the abutting arch 2423 is further formed with a plurality of parallel grooves 2426, so that a plurality of concave-convex structures are formed in the abutting arch 2423; and correspondingly, as shown in FIG. 7, the surface, in contact with the plane of the abutting arch 2423, of the driving shaft 11 is also a plane 111 which is provided with a plurality of similar concave-convex structures 112. Through the cooperation of the concave-convex structures 2426 and 112 on the abutting arch 2423 and the driving shaft 11, the contact tightness of the driving shaft 11 and the elastic element 24 can be enhanced, and the anti-slip effect is improved. It can be understood that the two clamping portions in the embodiments of the invention are not limited to the above form, and may be also in other forms. For example, the vertex ends of the abutting arches of the two clamping portions both are flat surfaces or arc surfaces. Moreover, the plane of the vertex end of the abutting arch in this embodiment is not limited to a plane with the grooves form mentioned above, and may also be in other forms as long as the plane can meet the roughness requirement and can improve the friction. In addition, as shown in FIG. 5, a coating 243 for lowering noises and improving wear resistance is disposed on the outer surface of the elastic element 24, and the coating may be made of rubber oil.

In this embodiment, due to the distance between the vertexes of the two abutting arches 2423 is smaller than the radial thickness of the driving shaft 11 when the abutting arches 2423 are not stressed, namely when the handle 1 and the brush head 2 are not assembled, the driving shaft 11 will apply an outward expansion force to the clamping portions 242 after assembly to cause the abutting arches 2423 to deform, and the inner wall of the brush head body 21 forces the abutting arches 2423 to rebound, so that the two clamping portions 242 tightly clamp/grasp the driving shaft 11 from both sides of the driving shaft 11. The brush head 2 is simple in structure. The driving shaft 11 is firmly clamped by the elastic element 24 so that the brush head 2 and the driving shaft 11 are connected stably.

The above embodiments are merely preferred ones of the invention, and are not intended to limit the invention. All variations, modification, substitutions, combinations and simplifications made without departing from the spirit and principle of the invention should be construed as equivalents of the invention and should also fall within the protection scope of the invention.

What is claimed is:

1. A brush head of an electric toothbrush, comprising:
    a hollow brush head body;
    bristles disposed at an end of the brush head body; and
    a connecting member and an elastic element being disposed in the brush head body;

wherein the connecting member is detachably mounted in the brush head body, the connecting member defining a slot to allow a driving shaft of an electric toothbrush to be mounted therein;

wherein the elastic element is mounted on an outer surface of the connecting member and comprises a connecting portion and two clamping portions extending from opposite sides of the connecting portion, the connecting portion is located at a top of the connecting member, and ends, close to the connecting portion, of the clamping portions and ends, away from the connecting portion, of the clamping portions are clamped between the connecting member and the brush head body, so that a resilience force is generated in a middle of each said clamping portion;

wherein a through opening is formed in a position, corresponding to a middle portion of each of the clamping portions, of the connecting member, and the middle portion of each of the clamping portions is inwardly bent into the through opening to form an abutting arch capable of deforming elastically in a radial direction of the slot;

wherein when the abutting arches are not stressed, a distance between vertex ends of the abutting arches is smaller than a radial thickness of the driving shaft of the electric toothbrush, and when the driving shaft is inserted into the slot of the connecting member, the abutting arches extend through the through openings with the vertex ends directly abutting against two opposite sides of the driving shaft respectively, and wherein a limiting hook is bent inwardly from the end, away from the connecting portion, of each of the clamping portions, recesses are correspondingly formed in the connecting member, and the limiting hooks are respectively located in the recesses and capable of sliding in the recesses in an axial direction of the slot.

2. The brush head of an electric toothbrush according to claim 1, wherein an end, close to the bristles, of the connecting member is provided with two limiting blocks which are arranged one above the other in a spaced manner in the axial direction of the slot, and the through openings are located between the limiting blocks;
    the connecting portion is clamped between a top end of one of the limiting blocks close to the bristles and an inner wall of the brush head body, the two clamping portions are located on two opposite sides of the limiting blocks respectively with the abutting arches extending into the through openings; and
    each of the limiting blocks has two limiting portions which are symmetrically arranged in the axial direction of the slot, the slot extends from an end of the connecting member into the limiting block close to the bristles, and the clamping portions abut against the two symmetrical limiting portions respectively.

3. The brush head of an electric toothbrush according to claim 2, wherein surfaces, close to two ends of the abutting arches, of the limiting portions are slopes, and the two ends of the two abutting arches abut against the corresponding slopes.

4. The brush head of an electric toothbrush according to claim 1, wherein the outer surface of the connecting member is formed with a concave mounting groove corresponding to the elastic element, and depths of portions of the mounting groove corresponding to the clamping portions are smaller than thicknesses of the clamping portions.

5. The brush head of an electric toothbrush according to claim 4, wherein surfaces of the clamping portions protrude out of the surface of the connecting member by a thickness of 0.01 mm-0.3 mm.

6. The brush head of an electric toothbrush according to claim 1, wherein a gap formed between a surface, corresponding to the two clamping portions, of the connecting member and an inner wall of the brush head body is 1 mm-1.8 mm.

7. The brush head of an electric toothbrush according to claim 1, wherein one of two opposite outer surfaces of the connecting member is a plane, and the other one is an arc surface.

8. The brush head of an electric toothbrush according to claim 1, wherein a distance between the vertex end of one of the clamping portions and a central axis of the slot is equal to a distance between the vertex end of the other of the clamping portions and the central axis of the slot, and the two clamping portions are symmetric in shape with respect to the central axis of the slot.

9. The brush head of an electric toothbrush according to claim 1, wherein a distance between the vertex end of one of the clamping portions and a central axis of the slot is equal to a distance between the vertex end of the other of the clamping portions and the central axis of the slot, and the two clamping portions are asymmetric in shape with respect to the central axis of the slot.

10. The brush head of an electric toothbrush according to claim 9, wherein the vertex end of the abutting arch of one of the clamping portions is a plane with a plurality of grooves, and the vertex end of the abutting arch of the other clamping portion is an arc surface.

11. The brush head of an electric toothbrush according to claim 1, wherein a coating for lowering noises and improving wear resistance is disposed on an outer surface of an elastic element.

* * * * *